United States Patent [19]

Biondetti

[11] 4,000,979
[45] Jan. 4, 1977

[54] ROLL FOR A ROLLING MILL

[75] Inventor: Mario Biondetti, Schio, Italy

[73] Assignee: Escher Wyss Limited, Zurich, Switzerland

[22] Filed: Feb. 18, 1976

[21] Appl. No.: 659,095

[30] Foreign Application Priority Data

Feb. 18, 1975 Switzerland .................. 2023/75

[52] U.S. Cl. ........................ 29/115; 29/116 AD
[51] Int. Cl.² ................................ B60B 15/16
[58] Field of Search ........ 29/113 AD, 115, 116 AD

[56] References Cited
UNITED STATES PATENTS

| 3,766,620 | 10/1973 | Roerig | 29/115 |
| 3,855,681 | 12/1974 | Andriola et al. | 29/115 |
| 3,889,334 | 6/1975 | Justus et al. | 29/115 |
| 3,921,514 | 11/1975 | Biondetti | 29/116 AD X |
| 3,949,455 | 4/1976 | Biondetti | 29/116 AD |

Primary Examiner—Wayne L. Shedd
Attorney, Agent, or Firm—Pennie & Edmonds

[57] ABSTRACT

A roll shell is rotatable about a stationary support beam with hydrostatic support means therebetween, preferably a row of piston-cylinder support devices, thereby forming a sag-compensating roll. The shell has external annularly disposed gear teeth at one end. A transmission casing encircles the end and is rotatably mounted thereon by bearings on each side of the gear teeth. Gear means in the casing drives the roll shell. Torque support means is connected between the casing and a fixed support to restrain rotation of the casing, and is advantageously connected to the casing in a plane through the roll axis and the row of support devices.

5 Claims, 2 Drawing Figures

ROLL FOR A ROLLING MILL

The invention relates to a sag-compensating roll for a rolling mill comprising a stationary support beam about which a roll shell is rotatable, the roll shell being supported on the beam by means of hydrostatic support means and being provided with gear teeth.

Rolls of this type are disclosed, for example, in U.S. Pat. Nos. 2,908,964 and 3,766,620. In U.S. Pat. No. 2,908,964 the teeth are in the form of a sprocket wheel driven by a chain from a drive gear rotatable about a fixed axis, and has the disadvantage that lateral forces result which have an unfavorable effect on the roll shell. The form of construction according to U.S. Pat. No. 3,766,620 has the disadvantage of being relatively complicated and expensive.

The object of the invention is to provide a roll of this type in which the drive means is simple and in which there are no disturbing lateral forces caused by the drive.

To this end, the roll according to the invention is characterized in that the casing of a transmission is rotatably mounted on the outside of the roll shell by bearing means encircling the roll shell on either side of the teeth, the said transmission including gear means cooperating with the teeth of the shell to drive the shell, and the casing being connected to a fixed support by means of torque support means which restrains rotation of the casing. This provides a mechanically simple form of construction in which all the forces produced by the drive are contained in the casing and the counter torque is restrained in a simple manner.

Preferably the lever arm of the torque support of the casing is situated in the plane of action of the hydrostatic support elements. Consequently the torque reaction acts at right angles to the plane of the hydrostatic support elements and hence has no influence on the action of the forces exerted on the roll shell in the direction of a coacting counter roll.

The hydrostatic support means preferably take the form of piston-like members guided in seal-tight relationship in cylinders mounted on or formed in the support beam. This construction is reliable and suitable for the highest pressures.

The invention is explained with reference to an exemplified embodiment illustrated diagrammatically in the drawings, wherein.

Figure 1:
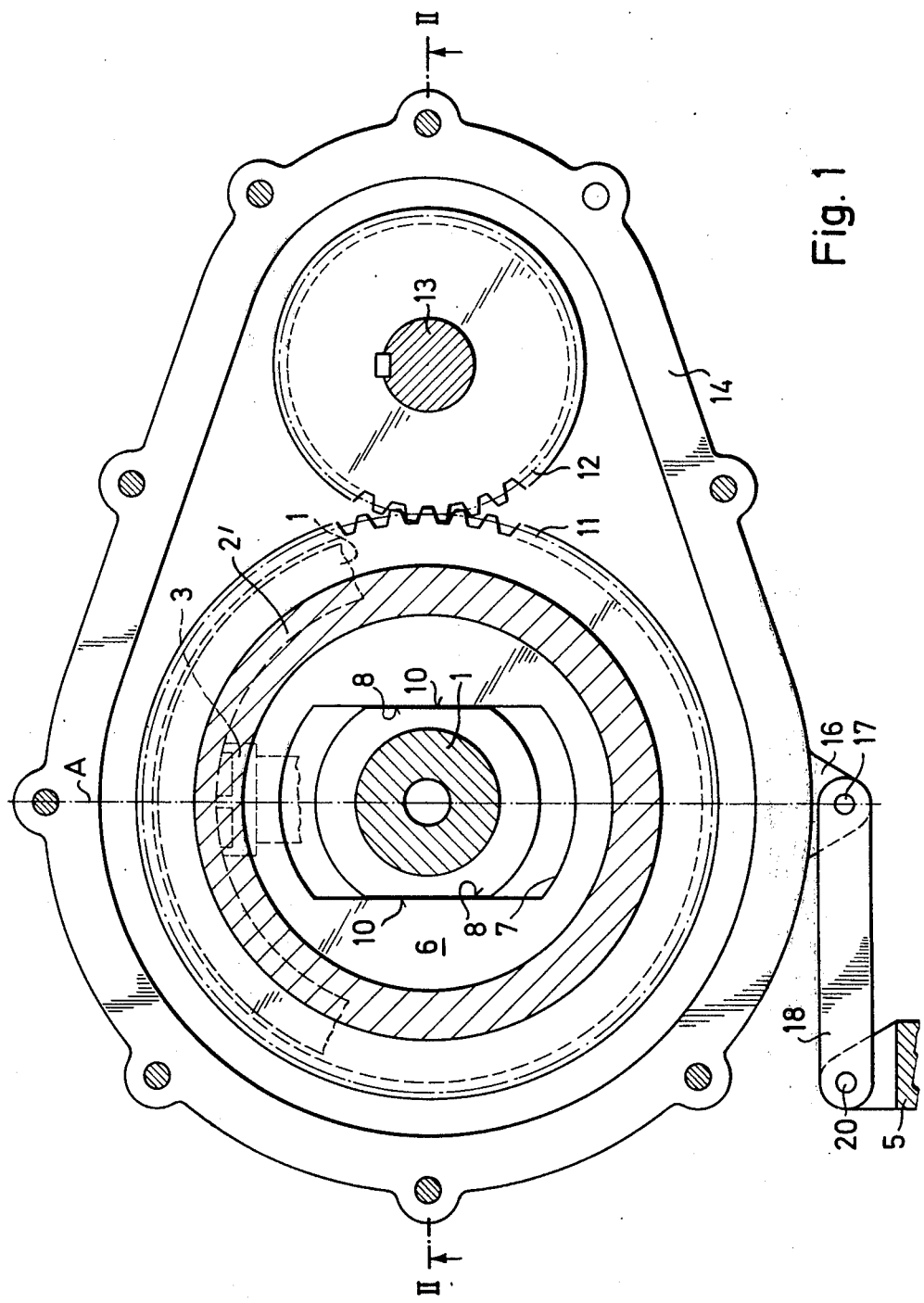
FIG. 1 is a section on II—II of FIG. 2.

The drawings show a sag-compensating roll comprising a stationary central support beam 1 and a roll shell 2 rotatable about the beam. The shell 2 is supported on the beam by hydrostatic support devices 3 of the type disclosed, for example, in U.S. Pat. No. 3,802,044. The ends of the beam 1 are supported in uprights 5 by means of spherical bearing bushes 4. To guide the shell 2 with respect to beam 1 in a plane A of the direction of the forces exerted by the hydrostatic support devices 3, discs 6 are mounted rotatably in the roll shell and each disc has an elongated aperture 7 whose side surfaces 8 are guided on flat side surfaces 10 of the beam 1. A construction of this kind is disclosed, for example, in U.S. Pat. No. 3,885,283. The roll shell 2 is provided with an extension member 2' which forms a part of the shell.

For drive purposes, the extension 2' of the roll shell is provided with external annularly disposed gear teeth 11 meshing with the teeth of a gear wheel 12 whose shaft 13 is mounted rotatably in a casing 14. The casing 14 is mounted rotatably in bearings 15 encircling the outside of the extension 2'.

To prevent the casing 14 from rotating with respect to the beam 1, the casing is provided with a projection 16 connected by a pivot 17 to a rod 18 whose other end is connected by a pivot 20 to a fixed support which may be a part of one upright 5. The parts 16, 17 and 20 form a torque support for the casing 14.

As will be apparent from FIG. 1, the pivot 17 forming the end of the torque support lever arm is situated in the plane A of the hydrostatic support devices 3.

Figure 2:
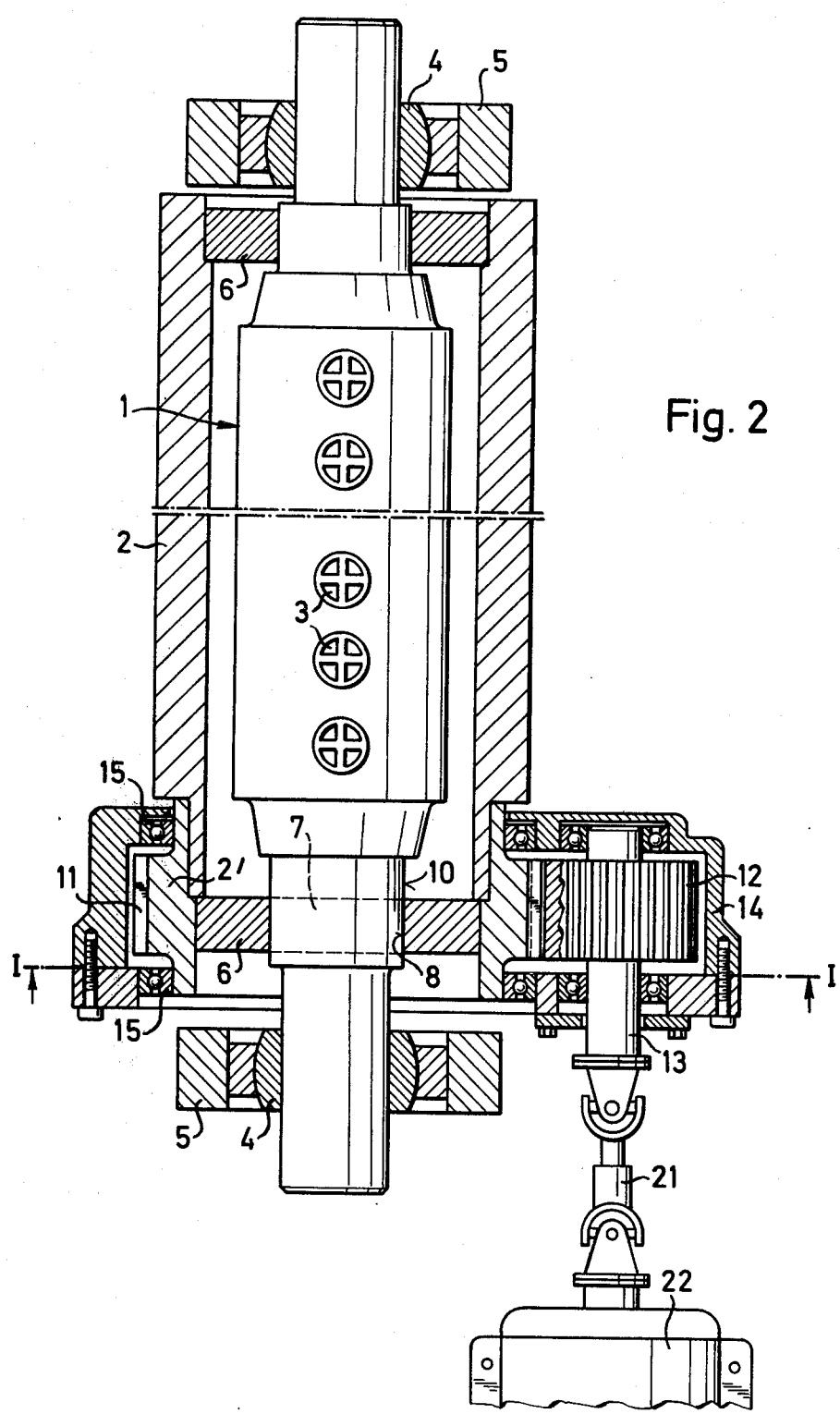
FIG. 2 is an axial partial section of the roll taken along line I—I in FIG. 1.

As shown in FIG. 2, a Cardan shaft 21 is connected to the shaft 13 of gear wheel 12 and is driven by a motor 22. The Cardan shaft forms a universal coupling to provide flexibility in the drive.

As will be understood, any movement of bending of the end of the roll shell does not affect the alignment between the driving gear 12 and the gear teeth on the end of the roll shell, since the transmission casing 14 is rotatably mounted on the end of the roll shell, the Cardan shaft 21 providing any required flexibity to the motor 22. Yet, as will also be observed, the driving means is fairly simple.

In the drawings, the transmission in the casing 14 is illustrated in the form of a gear wheel transmission with a single gear wheel 12 meshing with teeth 11 on the roll shell. The transmission may, of course, alternatively comprise a plurality of gear wheels arranged in a drive train. An embodiment using a chain is also possible, the teeth 11 being sprocket gear teeth and the gear wheel 12 being a sprocket wheel. Nor need the roll shell be guided on the beam by means of the apertured discs 6. The roll shell ends may alternatively be mounted on the beam in roller bearings. Further, the teeth 11 need not be on an extension of the roll shell, as shown, but may be disposed directly on the roll shell together with the bearings 15.

I claim:
1. A sag-compensating roll for a rolling mill which comprises
   a. a stationary support beam,
   b. a roll shell rotatable about said beam,
   c. hydrostatic support means for supporting said shell on said beam,
   d. external annularly disposed gear teeth at one end of said roll shell,
   e. a transmission casing encircling said one end of the roll shell,
   f. bearing means encircling said end of the roll shell on each side of said annularly disposed gear teeth for rotatably mounting said casing on said end,
   g. gear means rotatably mounted in said casing and cooperating with said annularly disposed gear teeth for driving said roll shell,
   h. and torque support means connected between said casing and a fixed support for restraining rotation of the casing with respect to the fixed support.

2. A roll according to claim 1 in which the said gear means mounted in the casing meshes with said annularly disposed gear teeth.

3. A roll according to claim 1 in which said torque support means is connected to said casing in a plane through the roll axis in which said hydrostatic support means exerts support forces on said roll shell.

4. A roll according to claim 1 in which said hydrostatic support means includes a row of hydraulic piston-cylinder support devices spaced along the roll in a direction parallel to the roll axis, said devices being mounted on said support beam for exerting support forces against said roll shell.

5. A roll according to claim 4 in which said gear means mounted in the casing meshes with said annularly disposed gear teeth, and in which said torque support means is connected to said casing in a plane through the roll axis and said row of support devices.

* * * * *